United States Patent [19]

Maruyama et al.

[11] Patent Number: 5,073,149
[45] Date of Patent: Dec. 17, 1991

[54] DIAPHRAGM SEAL TYPE TENSIONER

[75] Inventors: Masao Maruyama; Nobuto Kozakura, both of Hanno; Katsuya Nakakubo, Tokorozawa; Nobuo Okamoto, Muko, all of Japan

[73] Assignee: Tsubakimoto Chain Co., Osaka, Japan

[21] Appl. No.: 626,734

[22] Filed: Dec. 13, 1990

[30] Foreign Application Priority Data

Dec. 14, 1989 [JP] Japan .................. 1-143582[U]

[51] Int. Cl.⁵ .................................................. F16H 7/22
[52] U.S. Cl. ...................................... 474/104; 474/110
[58] Field of Search .............. 474/135, 112, 110, 103, 474/104

[56] References Cited

U.S. PATENT DOCUMENTS

| | | | |
|---|---|---|---|
| 4,708,696 | 11/1987 | Kimura et al. | 474/103 |
| 4,713,044 | 12/1987 | Nakamura et al. | 474/135 |
| 4,790,796 | 12/1988 | Okabe et al. | 474/110 |
| 4,798,563 | 1/1989 | Okabe et al. | 474/110 |
| 4,904,230 | 2/1990 | Kawashima et al. | 474/112 |
| 4,950,209 | 8/1990 | Kawashima et al. | 474/110 |

OTHER PUBLICATIONS

Drawing from Japanese Patent laidopen publication 63-145859.
Drawing from Japanese Utility Model laid open publication 63-1954.

*Primary Examiner*—Ramon S. Britts
*Assistant Examiner*—Roger J. Schoeppel
*Attorney, Agent, or Firm*—Howson & Howson

[57] ABSTRACT

In a fluid tensioner for a camshaft drive belt, a piston rod is sealed by a flexible diaphragm having an enlarged inner end clamped in a conforming groove in the piston rod by a spring clamp. This maintains the inner end of the diaphragm at a fixed position on the piston rod, and provides a labyrinthine seal preventing leakage of fluid. A flattened portion of the piston rod fits a D-shaped opening in a cap to prevent rotation of the piston rod and premature failure of the seal. A dust seal located on the cap also has a D-shaped hole, aligned with the D-shaped hole in the cap, and conforming to the flattened part of the piston rod.

17 Claims, 4 Drawing Sheets

DIAPHRAGM SEAL TYPE TENSIONER

BRIEF SUMMARY OF THE INVENTION

This invention relates to tensioners of the kind used to adjust the tension of the camshaft drive belt or chain in an automobile engine. It relates especially to tensioners which utilize a hydraulic fluid to provide for rapid take-up of slack and slow release of excessive tension, and in particular to improvements in diaphragm seals used in such tensioners to contain the hydraulic fluid and prevent leakage.

In general a toothed belt or chain requires a suitable tension in order to prevent skipping of the belt teeth or chain links on the sprockets. In the case of a toothed belt used for driving the camshaft of an automobile engine, for example, tension in the belt may become too large or too small as a result of temperature changes which cause different degrees of expansion and contraction of the belt and the engine block. When tension in the belt departs from the ideal range, oscillations and noise, and in extreme cases, skipping, can result. Accordingly belt tension must be maintained in a suitable range by means of a tensioner.

A typical example of such a tensioner is given in U.S. Pat. No. 4,708,696, dated Nov. 24, 1987. This conventional tensioner includes a cylinder filled with a hydraulic fluid, a piston in sliding engagement with the inner wall of the cylinder with a clearance between the piston and the cylinder, a piston rod fixed to the piston, a spring for advancing the piston rod, a fluid passage providing communication between a front chamber and a rear chamber partitioned from each other by the piston, and a check valve provided in the passage for permitting flow of hydraulic fluid from the front chamber to the rear chamber.

In the conventional tensioner, the hydraulic fluid in the front chamber is sealed by an annular seal inserted between an inner circumferential surface of the cylinder and an outer circumferential surface of the piston rod. With this arrangement, leakage of hydraulic fluid and the entry of air through the gap between the piston rod and the seal cannot be avoided. In the conventional tensioner, it is also necessary to provide a reservoir for the hydraulic fluid.

The aforementioned problems in conventional tensioners have been addressed in the past by sealing the front chamber by means of a diaphragm which is fixed at its inner end to the outer circumferential surface of the piston rod, and at its outer end to the inner circumferential surface of the cylinder. This approach is described in Japanese Patent laid-open publication 63-145859 and in Japanese Utility Model laid-open publication 63-1954. One difficulty with this approach, however, is that the seal produced between the diaphragm and the piston rod is achieved by press-fitting the diaphragm onto the rod. In publication 63-1954, for example, the diaphragm is press fit into an annular space formed between the wall of a bore in the piston and a member secured to the end of the piston rod. The necessity of press-fitting gives rise to manufacturing difficulties, and unreliable sealing. Furthermore, in some cases, the press-fitting operation gives rise to a reduction in strength of the piston rod, which may impair performance of the tensioner.

The principal object of this invention is to provide a diaphragm-type tensioner having a secure seal between the diaphragm and the piston rod. It is also an object of the invention to make a tensioner which is easier and less expensive to manufacture. It is also an object of the invention to provide a tensioner having improved reliability.

In accordance with the invention, the above-described problems of conventional tensioners and of tensioners with press-fit diaphragms are solved by providing an annular, circumferential groove in the piston rod and fitting the inner end of the diaphragm in the annular, circumferential groove. By fitting the inner end of the diaphragm in the annular, circumferential groove, the need for press-fitting, and the attendant problems, are avoided.

Preferably, the diaphragm is clamped in the groove by means of a spring clamp comprising a single turn of a spring coil located in the front chamber of the cylinder. This maintains the inner end of the diaphragm at a fixed position on the piston rod, and prevents that fixed position from moving relative to the rod even if oscillation of the piston rod occurs.

The diaphragm preferably comprises a thin, flexible sheet extending between its inner and outer ends, and the inner end of the diaphragm is in the form of an enlarged annulus having an axial length substantially equal to the axial length of the groove in the piston rod. The enlarged annulus also preferably has a radial thickness greater than the thickness of the sheet, and the sheet meets the annulus at a location spaced radially outward from the piston rod.

In the preferred form of the invention, the piston rod is provided with a non-circular, cross-section along at least a part of its length. This is most readily accomplished by milling a flat on the rod. A cap, provided on the cylinder is fixed against rotation relative to the cylinder, and has a non-circular, e.g. D-shaped, hole slidably receiving the piston rod. The non-circular hole conforms to the part of the length of the piston rod having the non-circular cross-section, and prevents rotation of the piston rod relative to the cylinder.

A dust seal located on the cap also has a non-circular hole, aligned with the non-circular hole in the cap, and conforming to the part of the length of the piston rod having the non-circular cross-section.

In the operation of the tensioner, the outer end of the piston rod causes a roller to bear against the toothed belt on the return side, i.e. the side moving from the driving sprocket toward the driven sprocket. The piston is advanced and retracted in response to changes in tension in the belt.

When the piston retracts in response to an increase in belt tension, the hydraulic fluid in the rear chamber flows through the clearance between the piston and the cylinder into the front chamber. At this time, the diaphragm changes shape, thereby absorbing volume changes which occur as a result of movement of the piston and piston rod. Retraction of the piston occurs gradually as a result of the viscosity of the fluid and the resistance imposed to flow through the clearance between the cylinder and the piston.

On the other hand, when belt tension is reduced, the piston rod is advanced by the advancing spring, and the check valve in the fluid passage is simultaneously opened. Accordingly, the hydraulic fluid is allowed to flow into the rear chamber, so that a predetermined tension is restored to the belt.

The foregoing objects, as well as other objects and advantages of the invention will become more fully apparent from the following detailed description, when read in conjunction with the drawings.

DETAILED DESCRIPTION

Figure 1:
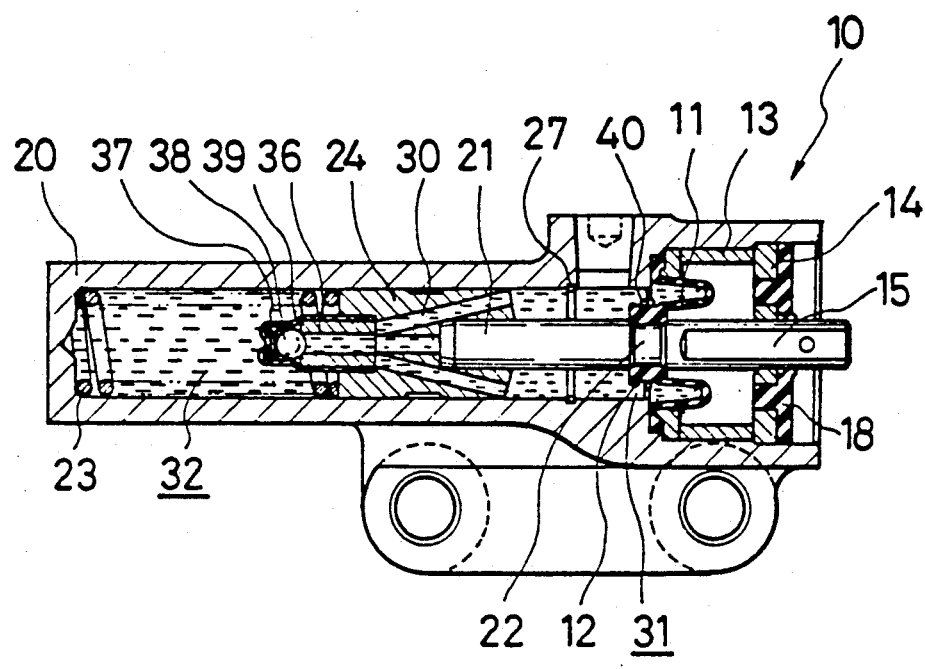
FIG. 1 a longitudinal section of a tensioner in accordance a preferred embodiment of the invention.
Figure 2:
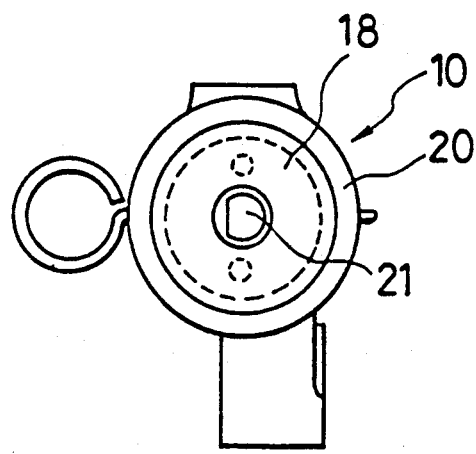
FIG. 2 a right side elevational view of the tensioner of FIG. 1.

Referring to FIGS. 1 and 2, tensioner 10 comprises a cylinder 20 having a piston 24 slidable in a cylindrical bore. The piston fits loosely in the cylinder to provide a clearance between the piston and the wall of the bore. This clearance provides a restricted passage for the flow of hydraulic fluid past the piston as the piston moves axially in the bore. A piston rod 21 is press-fit to the piston.

Piston 24 divides the interior of the cylinder into a front chamber 31 and a rear chamber 32. The piston is provided with inclined passage 30, which provides fluid communication between the front chamber 31 and the rear chamber 32. There may be several such inclined passages, e.g. two or four.

A ring 27, fitted into the bore of the cylinder, is engageable by the piston and imposes a limit on extending movement (rightward movement in FIG. 1) of the piston.

A compression spring 23, located in rear chamber 32, is held in compression between the piston and an end wall of the cylinder so that it urges the piston in the extending direction. A retainer 39, secured to the piston, holds a ball 38. A weak spring 37 urges the ball against a seat 36. The internal passage of the seat is in communication with the inclined passages in the piston. The ball and seat provide a check valve which permits flow of hydraulic fluid through the inclined passages from front chamber 31 to rear chamber 32.

Spring 23 applies an initial tension to the toothed belt 42, (shown in) through piston 24, piston rod 21 arm 43, which is pivoted at 44, and roller 46 on the opposite end of the arm. When tension in the belt decreases as a result of stretching of the belt, or as a result of temperature changes in the belt or in the associated mechanical parts, or both, spring 23 causes the piston to move in the advancing direction to restore the initial tension in the belt. Advancing movement of the piston increases fluid pressure in front chamber 31. This causes the check valve to open to allow hydraulic fluid to flow freely from front chamber 31 to rear chamber 32. Consequently, advancing movement of the piston can take place rapidly so that the initial tension is restored immediately.

The front chamber 31 is defined by the internal wall of cylinder 20, by piston rod 21, and an annular diaphragm 11.

The diaphragm is fixed at its inner end to piston rod 21 and at its outer end to cylinder 20. The outer end of the diaphragm, which is preferably formed with an increased axial thickness, is pressed axially against a radial step formed in the bore of the cylinder by a two-element clamp 13.

The piston rod 21 is provided with a radially oriented circumferential annular groove 22. The inner end of the diaphragm 11 is formed with an increased thickness to provide an enlarged annular portion 12. The thin portion of the diaphragm extends from the enlarged annular portion 12 at a location spaced radially outward from the piston rod, as seen in FIG. 1. The enlarged portion 12 extends toward the interior of the front chamber 31 so that the thin portion of the diaphragm is a simple, single convolution projecting axially toward the belt-engaging end of the piston rod.

Figure 3:
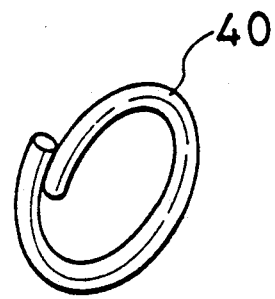
FIG. 3 is a perspective view of a coil spring used to secure the inner end of the tensioner in a groove on the piston rod.
Figure 8:
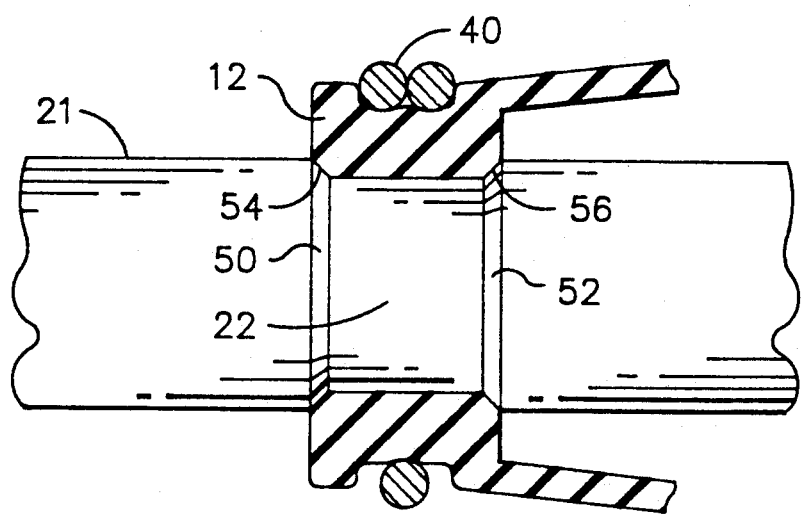
FIG. 8 is a enlarged fragmentary elevation, partly in section, showing the details of the manner in which the diaphragm is clamped in a circumferential groove in the piston rod.

Annular portion 12 has a recess in its outer circumference for receiving a spring clamp 40 (also shown in FIGS. 3 and 8), which exerts an inwardly directed radial force on portion 12 to fix portion 12 reliably in groove 22. The recess prevents spring clamp 40 from sliding axially relative to diaphragm portion 12, thereby insuring that portion 12 is firmly held in groove 22. The recess also prevents the coil spring clamp from becoming accidentally disengaged from portion 12 of the diaphragm.

Preferably, the axial length of portion 12 is substantially equal to the axial length of groove 22. The combination of the conformity of the axial length of portion 12 of the diaphragm to the axial length of the groove, and the inward force exerted by the spring clamp on portion 12, insure that the diaphragm is firmly secured to the piston rod and cannot slide axially on the rod when oscillation of the rod occurs.

The depth of groove 22 is preferably in the range of 0.3 to 0.5 mm. The shape of portion 12 of the diaphragm preferably conforms to that of the groove, so that the interface between portion 12 of the diaphragm and the piston rod is labyrinthine in shape. For example, if the ends of groove 22 are bevelled, as shown at 50 and 52 in FIG. 8, diaphragm portion 22 is correspondingly bevelled at 54 and 56 to conform to the shape of the groove. Thus, a labyrinth seal is formed between the diaphragm and the piston rod. The combination of the labyrinth and the force of spring 40 provides a particularly reliable seal, preventing leakage of hydraulic fluid to the outside of the cylinder. A labyrinth seal is also formed at the outer end of the diaphragm. The portion of the two-element clamp which engages the enlarged outer end of the diaphragm has a ring-shaped projection which is radially narrow compared to the radial extent of the enlarged outer end of the diaphragm and presses into and deforms the diaphragm material at a location spaced inward from the outer edge of the diaphragm, while leaving the outer edge of the diaphragm less deformed. The ring-shaped projection thereby securely prevents the outer part of the diaphragm from becoming disengaged from the wall of the cylinder, and providing a secure seal against the escape of hydraulic fluid.

Figure 4:
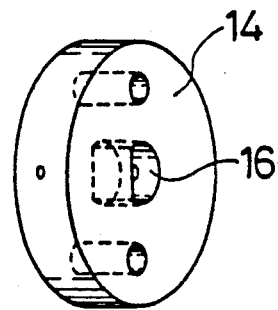
FIG. 4 perspective view of the cap.

A cap 14 is mounted in the cylinder in concentric relationship with the piston rod. The piston rod is provided with a flat portion 15 along part of its length extending from it rightmost end toward piston 24. Cap 14 is provided with a substantially D-shaped hole 16 (FIG. 4), which conforms to the cross-sectional shape of the flattened portion of piston rod 21. The flattened portion of the piston rod extends through the D-shaped hole, and conformity of the non-circular shapes of the rod and the hole prevents rotation of the piston rod, which could result in premature failure of the diaphragm. The axial length of the flat portion 15 is greater than the sum of the range of reciprocation of the piston and the depth of hole 16.

Figure 5:
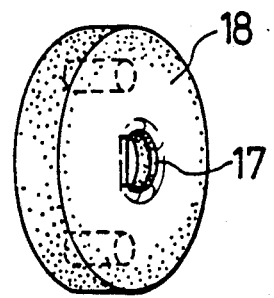
FIG. 5 a perspective view of the dust seal.

A dust seal 18, as shown in FIG. 5, is mounted on the atmosphere side of cap 14 and is prevented from rotation relative to the cap by the engagement of projections on the dust seal with corresponding holes in the cap. The flattened portion of piston rod 21 extends through a central hole in the dust seal, and the central hole in the dust seal is provided with a substantially D-shaped lip 17, which conforms to the cross-sectional shape of the flattened portion of the piston rod. The dust seal is formed from rubber, engineering plastics, or similar material.

Figure 6:
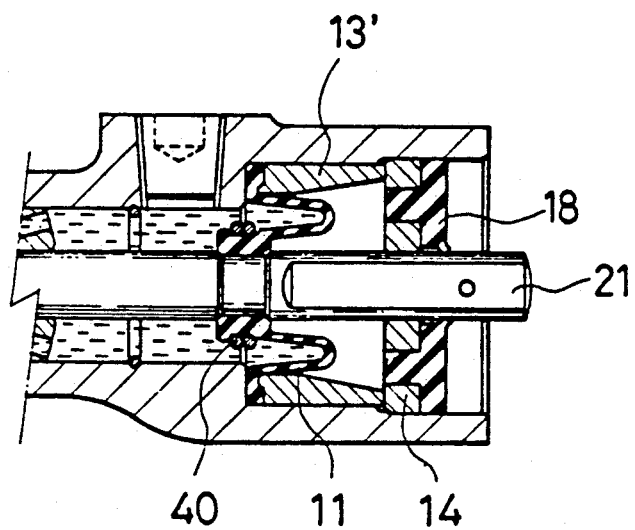
FIG. 6 a fragmentary view of a modified version of the tensioner, in which the outer end of the diaphragm is secured to the cylinder by a one-element clamp.
Figure 7:
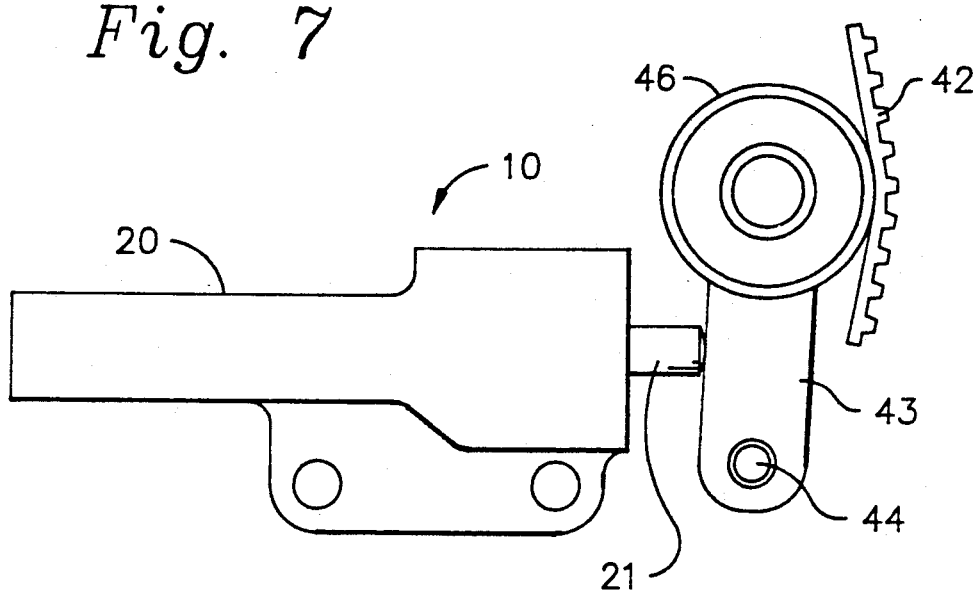
FIG. 7 is a fragmentary elevational view of a tensioner in accordance with the invention, shown applying a tensioning force to a toothed belt through a pivoted roller.

FIG. 6 shows a modified version of the tensioner, in which the enlarged outer portion of the diaphragm is clamped in place against a radial step in the bore of the cylinder by a single, generally frusto-conical clamping element 13'. Clamp 13' has a ring-shaped projection, similar to that of the diaphragm-engaging element of clamp 13, for deforming the diaphragm material, thereby preventing it from becoming disengaged from the cylinder.

The tensioner in accordance with the invention has all of the capabilities of a conventional tensioner, with a number of additional advantages, especially the fact that the diaphragm can be securely attached to the cylinder and piston assembly without the need for press-fitting as in conventional tensioners; the fact that its diaphragm has an enhanced sealing effect; the fact that the diaphragm is easily and reliably secured against movement relative to the piston; and the fact that premature failure of the diaphragm due to rotation of the piston is prevented.

Various modifications can be made to the invention described above. For example, while the piston is most conveniently prevented from rotating relative to the cylinder by the cooperation of a D-shaped hole in a cap with a flattened portion of an otherwise circular piston rod, rotation can be prevented by the use of various alternative non-circular shapes in the rod and cap. Similarly, the enlarged inner portion of the diaphragm and the groove can be formed in alternative shapes, for example multiple-stepped shapes. Still other modifications can be made to the embodiments described, without departing from the scope of the invention as defined in the following claims.

We claim:

1. A diaphragm seal type tensioner including a cylinder having an inner wall and containing a hydraulic fluid, a piston arranged to slide in said cylinder, said piston partitioning the cylinder into a front chamber and a rear chamber, a piston rod fixed to said piston and extending therefrom, through said front chamber to the exterior of the cylinder, spring means for imparting an advancing force to said piston rod, means providing a restricted hydraulic fluid passage for permitting fluid communicating between said front chamber and said rear chamber, check valve means provided in said hydraulic fluid passage for permitting flow of the hydraulic fluid from said front chamber to said rear chamber, and a diaphragm, having inner and outer ends, for sealing said front chamber, the outer end of the diaphragm being fixed to the cylinder and the inner end of the diaphragm being fixed to the piston rod, wherein the improvement comprises a radially oriented circumferential groove in said piston rod, with the inner end of said diaphragm fitted in said groove.

2. The diaphragm seal type tensioner of claim 1 in which the piston rod is provided with a flat portion along at least a part of its length, and including cap means fixed against rotation relative to said cylinder, said cap means having a D-shaped hole slidably receiving said piston rod, the D-shaped hole conforming to the part of the length of the piston rod having the flat portion, and preventing rotation of the piston rod relative to the cylinder.

3. The diaphragm seal type tensioner of claim 2 having a dust seal located on said cap means, said dust seal having a D-shaped hole, aligned with the D-shaped hole in said cap means, and conforming to said part of the length of the piston rod having the flat portion.

4. The diaphragm seal type tensioner of claim 1 including spring clamp means clamping said inner end of the diaphragm in said circumferential groove of the piston rod.

5. The diaphragm seal type tensioner of claim 4 in which said spring clamp means is located in said front chamber.

6. The diaphragm seal type tensioner of claim 4 in which the piston rod is provided with a flat portion along at least a part of its length, and including cap means fixed against rotation relative to said cylinder, said cap means having a D-shaped hole slidably receiving said piston rod, the D-shaped hole conforming to the part of the length of the piston rod having the flat portion, and preventing rotation of the piston rod relative to the cylinder.

7. The diaphragm seal type tensioner of claim 1 in which the piston rod is provided with a non-circular cross-section along at least a part of its length, and including cap means fixed against rotation relative to said cylinder, said cap means having a non-circular hole slidably receiving said piston rod, the non-circular hole conforming to the part of the length of the piston rod having the non-circular cross-section, and preventing rotation of the piston rod relative to the cylinder.

8. The diaphragm seal type tensioner of claim 7 having a dust seal located on said cap means, said dust seal having a non-circular hole, aligned with the non-circular hole in said cap means, and conforming to said part of the length of the piston rod having the non-circular cross-section.

9. The diaphragm seal type tensioner of claim 1 in which the inner end of the diaphragm is in the form of an annulus having an axial length substantially equal to the axial length of the groove in said piston rod.

10. The diaphragm seal type tensioner of claim 1 in which the inner end of the diaphragm is in the form of an annulus having an axial length substantially equal to the axial length of the groove in said piston rod, and having spring clamp means clamping said inner end of the diaphragm in said circumferential groove of the piston rod.

11. The diaphragm seal type tensioner of claim 1 in which the inner end of the diaphragm is in the form of an annulus, and in which said annulus extends into said front chamber.

12. The diaphragm seal type tensioner of claim 1 in which the inner end of the diaphragm is in the form of an annulus having a radially outwardly facing surface and a circumferential recess formed in said radially outwardly facing surface, and having spring clamp means, located in said circumferential recess and clamping said inner end of the diaphragm in said circumferential groove in said piston rod.

13. The diaphragm seal type tensioner of claim 1 in which the inner end of the diaphragm is in the form of an annulus having an axial length substantially equal to the axial length of the groove in said piston rod, and in which said annulus and said piston rod, at the location of said groove, meet each other along a labyrinthine interface.

14. The diaphragm seal type tensioner of claim 1 in which the inner end of the diaphragm is in the form of an annulus having an axial length substantially equal to the axial length of the groove in aid piston rod; in which said annulus and said piston rod, at the location of said groove, meet each other along a labyrinthine interface; and having spring clamp means clamping said inner end of the diaphragm in said circumferential groove of the piston rod.

15. The diaphragm seal type tensioner of claim 1 in which the diaphragm comprises a thin, flexible sheet extending between said inner and outer ends, in which the inner end of the diaphragm is in the form of an annulus having an axial length substantially equal to the axial length of the groove n said piston rod, and having a radial thickness greater than the thickness of said sheet, and in which said sheet meets said annulus at a location spaced radially outward from said piston rod.

16. The diaphragm seal type tensioner of claim 1 in which the diaphragm comprises a thin, flexible sheet extending between said inner and outer ends, in which the outer end of the diaphragm is in the form of an annulus having an axial thickness greater than the thickness of said sheet, and in which the inner wall of the cylinder has a radially extending surface, and including clamping means pressing axially against said annulus and thereby clamping said annulus against said radially extending surface.

17. The diaphragm seal type tensioner of claim 16 in which said clamping means and said radially extending surface comprise an axially extending ring-shaped projection which is radially narrow compared to the radial extent of said annulus, said ring shaped projection pressing into and deforming said annulus at a location spaced inward from the outer end thereof while leaving said outer end relatively less deformed, thereby preventing the outer end of the diaphragm from moving inward.

* * * * *